United States Patent [19]

Greenfield

[11] 4,056,270
[45] Nov. 1, 1977

[54] DEMOUNTABLE BOAT TRAILER STEP

[76] Inventor: Kenneth Greenfield, 2723 Hillcrest Lane, Caldwell, Idaho 83605

[21] Appl. No.: 702,182

[22] Filed: July 2, 1976

[51] Int. Cl.² .............................................. B60R 3/00
[52] U.S. Cl. .................................... 280/166; 108/44; 182/92
[58] Field of Search .............. 280/163, 164 R, 164 A, 280/165, 166; 182/92, 90; D12/203; 105/443, 449; 108/44; 248/228

[56] References Cited
U.S. PATENT DOCUMENTS

| 537,775 | 4/1895 | Kauffman | 182/90 |
|---|---|---|---|
| 566,919 | 9/1896 | Lewis et al. | 182/90 |
| 3,981,521 | 9/1976 | See | 280/163 X |

D. 23,753 10/1894 Swan ................................ D12/203

Primary Examiner—Joseph F. Peters, Jr.
Assistant Examiner—Michael J. Forman
Attorney, Agent, or Firm—Paul F. Horton

[57] ABSTRACT

A demountable boat trailer step including a foot plate having a pair of parallel slots adjacent each end and running substantially the full width of the plate, a plurality of bolts, a pair of clamp bars, and a plurality of nuts. The foot plate rests on the top surface of a boat trailer frame member and is demountably attached by means of bolts extending through the slots and engaging clamp bars contacting the undersurface of the frame member. Slots in the foot plate permit mounting on various sizes of frame members. Adapters are provided for attachment of the step to cylindrical frame members.

3 Claims, 6 Drawing Figures

DEMOUNTABLE BOAT TRAILER STEP

BACKGROUND OF THE INVENTION

1. Field of the Invention

This invention relates in general to boat trailer steps and in particular to boat trailer steps which are demountably attached.

2. Description of the Prior Art

The dangers of accidental drownings and injuries resulting from loading and unloading boats from trailers has long been recognized. Many boats are loaded and unloaded by sliding the boat on rollers. The winch cannot be disconnected until the boat is in the water when unloading, and when loading the winch line must be carried to the boat. The boat trailer frame members are extremely dangerous to walk on when wet, and many times the water temperature does not permit wading. To overcome these problems, trailer fenders have been used as steps and more recently permanent steps have been used. Permanent steps, by their very nature, are unsatisfactory because of individual preferences in footing, types and sizes of boats used with the trailers, and cost of construction. To satisfy individual preferences for footing in loading and unloading boats, permanent steps would have to be mounted around the complete periphery of the boat trailer, making for a bulky trailer, undesirable in appearance, costly in construction, and depending on size and shape of the boat, such a trailer might very well be unuseable.

BRIEF SUMMARY OF THE INVENTION

The present invention comprises a readily demountable boat trailer step including a foot plate with slots, bolts, clamp bars, and clamping means which provide a securely affixed step attachable to a variety of boat trailer frame members.

It is therefore an object of the present invention to provide a boat trailer step which is demountably attached to boat trailer frame members at varying locations.

It is a further object of the present invention to provide a boat trailer step which may be attached to a boat trailer frame in series to provide individual footing preferences.

It is a still further object of the present invention to provide a boat trailer step which is demountably attached to varying sizes and shapes of boat trailer frame members.

Another object of the present invention is to provide a demountable boat trailer step having a foot plate made of expanded metal for sure footing.

Additional objects and advantages will become apparent and a more thorough and comprehensive understanding may be had from the following description taken in conjunction with the accompanying drawings forming a part of the specification.

DETAILED DESCRIPTION OF THE INVENTION

Figure 1:
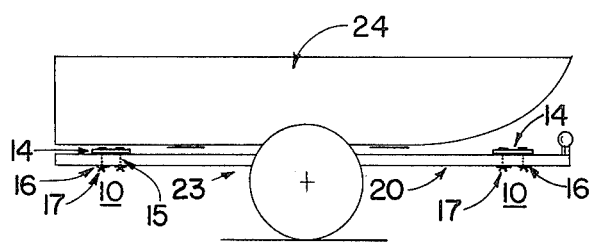
FIG. 1 is a view of a typical embodiment of the demountable step of the present invention shown attached to a boat trailer frame member.

Referring now to FIG. 1, a typical embodiment of a demountable step assembly 10, made according to the present invention, is disclosed. Step assembly 10 includes rectangular foot plate 14, bolts 15, clamp bars 16 and wing nuts 17. Step assembly 10 is shown attached at several locations on boat trailer frame member 20 of trailer 22 for easy access to boat 24.

Figure 2:
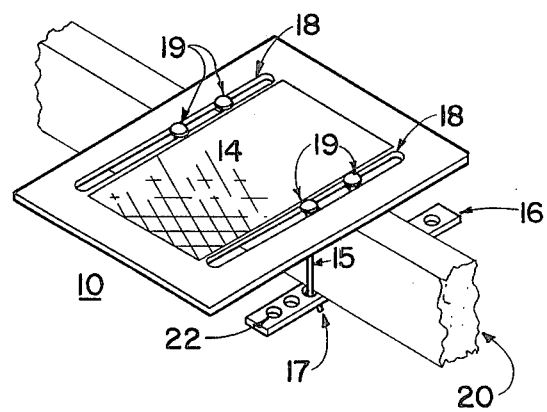
FIG. 2 is an elevated perspective view of the present invention showing details of attachment.

Referring now to FIG. 2, it will be seen that step assembly 10 may be attached at various locations along boat trailer frame member 20. It will also be seen that foot plate 14 may be moved to a number of positions horizonally transverse to frame member 20. This is accomplished by loosening wing nuts 17 on bolts 15 and simply sliding foot plate 14 to a new desired position. Slots 18 permit lateral movement of plate 14 in relation to bolts 15 located on each side of frame member 20. Tightening wing nuts 17 secures the step in a fixed relationship with the frame member by applying a downward clamping action on the top surface of the foot plate contacting the bottom surface of the head portion 19 of bolts 15, and an upward clamping action on the bottom surface of clamp bars 16 contacting the frame member.

Figure 3:
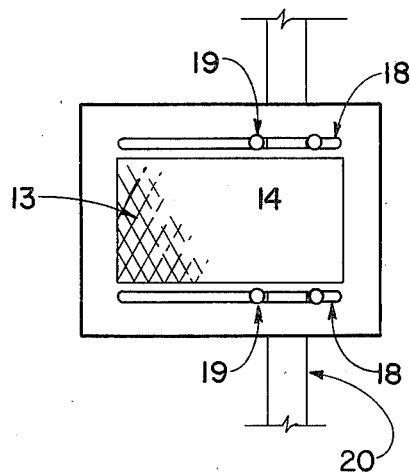
FIG. 3 is a plan view of the step.
Figure 4:
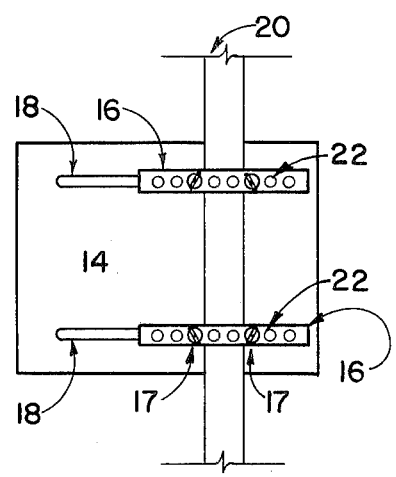
FIG. 4 is a bottom view of the step showing clamp bars.

Now, referring to FIGS. 3 and 4, foot plate 14 may be seen to advantage. Plate 14 is formed from a non-corrosive metal such as aluminum, or a metal covered with a corrosion resistant metal such as galvanized iron. The plate may also contain a skid resistant covering or paint. In the preferred embodiment, the plate is formed of expanded metal which has been galvanized. The expanded metal is the type conventionally used in the plastering art. In using expanded metal it is necessary that the portion of the plate surrounding the slots be smooth and flat to accomodate the head portions of bolts 15. The expanded metal portion may be attached to the smooth portion by welding or otherwise. Plate 14 has planar opposing sides providing for level footing and for maximum contact with frame member 20. The plate may be of any suitable size and thickness; a step 12 × 18 × 1 inches being contemplated. It is to be noted that the use of expanded metal in the foot plate prevents an accumulation of water on the plate and also gives good foot traction.

Bolts 15 are conventional round head, square shouldered, corrosion resistant bolts of a length sufficient to extend an inch or two beyond the depth of frame member 20. In most applications, four of the bolts are used to secure the foot plate to the boat trailer frame. Two bolts are placed through each of the slots 18 so that their square shoulders make loose contact with the interior lateral surfaces of opposing sides of each slot and so that the flat underside of the head portions 19 of the bolts abut flush with the upper surface of the plate 14. Each of the bolts in each slot is caused to straddle one side of the frame member 20 and each of the bolts in the other slot are caused to straddle the other side of the frame member. The bolts are then extended through holes 22 of clamp bars 16 and secured with wing nuts 17 as hereinafter more fully explained.

Clamp bars 16 are made of a corrosion resistant material such as galvanized iron. The bars contain a series of equally spaced holes 22 parallel to the sides of the bar, each of the holes being of slightly larger diameter than bolts 15. It is contemplated that the bars 16 will have crimped areas, not shown, every 2 or 3 inches which run across the width of the bar so that the bar may be broken at a desired length, thereby preventing bothersome overhangs.

Wing nuts 17 screw onto the threads of bolts 15 and contact the bottom surface of clamp bars 16, securely holding the step assembly to frame member 20. Although wing nuts are used in the preferred embodiment, it is understood that conventional nuts and other clamping means may be similarly employed.

Figure 5:
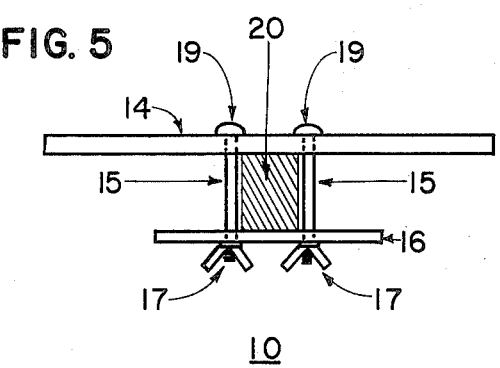
FIG. 5 is an end view showing attachment to a rectangular frame member.
Figure 6:
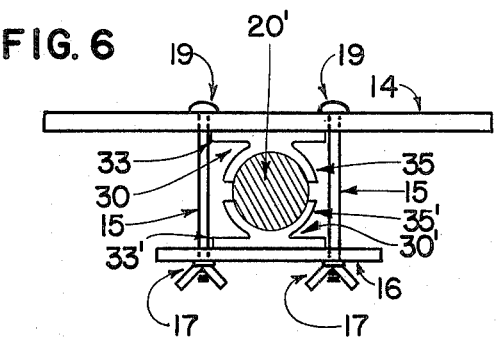
FIG. 6 is an end view showing the adapter device of the present invention mounted on a cylindrical frame member.

Step assembly 10 is usually mounted on standard rectangular frames 20, as shown in FIG. 5. Sometimes, however, the boat trailer will have a cylindrical frame 20' as shown in FIG. 6. To adapt the step assembly to a cylindrical frame, a pair of frame adapters 30 and 30' are used. Frame adapters 30 and 30' are identical in construction and differ only as to the mounting as may be seen in FIG. 6. The frame adapters include a contact plate, designated 33 and 33' in the figure, and a semicircular support member, designated 35 and 35' attached at the midpoint by welding to the contact plate. The width of the contact plates are slightly greater than the diameter of the frame member 20'. The interior contact surface of the semicircular support members have a diameter equal to or greater than the outer diameter of frame member 20', it being desirable to maximize contact area between the interior surfaces of the semicircular support members and the exterior surface of the frame members. The frame adapters may be of any suitable length and are made of plastic or corrosion resistant metal.

It will be seen that the frame adapters are fitted conveniently around the boat trailer frame member 20'. The top surface of contact plate 33 of adapter 30 supports plate 14 on plate 14's under surface. The contact plate 33' of adapter 30' rests on the top surface of clamp bars 16. As wing nuts 17 are tightened, an upward clamping pressure is exerted on the clamp bars 16 and the adapter 30', forcing the interior surface of semicircular support member 30' in a tight and fixed relationship with the exterior surface of the cylindrical frame 20'. Similarly a tightening of wing nuts 17 exerts a downward clamping pressure on the plate 14 in contact with the head portion of bolts 15. Plate 14 thereby exerts a downward pressure on frame adapter 30 in contact with the top surface of cylindrical frame member 20'. In this manner a safe and reliable securing of the step assembly to the boat trailer frame may be made in a short time.

Having thus described in detail a preferred embodiment of the present invention, it is to be appreciated and will be apparent to those skilled in the art that many physical changes could be made in the apparatus without altering the inventive concepts and principles embodied therein. The present embodiment is to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A demountable boat trailer step, which comprises:
a substantially rectangular foot plate having oppositely disposed planar surfaces, the bottom surface of said plate engaging the top surface of a boat trailer frame member, said plate having a pair of parallel slots extending substantially the full width of said plate and adapted to receive bolts for allowing horizontally transverse movement of said plate relative to the frame member;
a plurality of bolts extending through the slots and having head portions contacting the top surface of said foot plate;
a pair of clamp bars, each having a plurality of holes, equally spaced, through which said bolts extend, said clamp bars adapted to engage the underside of a trailer frame member; and
means engaging the ends of said bolts for securing said clamp bars to said bolts.

2. The demountable boat trailer step as defined in claim 1, wherein said foot plate is formed in part of expanded metal.

3. The demountable boat trailer step as defined in claim 1, further comprising a pair of frame adapters for attaching the step to a cylindrical boat trailer frame member, one of said adapters including a contact plate have a planar top surface engaging the bottom surface of said foot plate and a semicircular support member downwardly depending from the bottom surface of said contact plate, the interior surface of said support member adapted to receive and make substantial contact with the upper surface of the cylindrical frame member; the other adapter including a contact plate having a planar bottom surface engaging the top surface of said clamp bars, and a semicircular support member upwardly extending from the top surface of said contact plate, the interior surface of said support member adapted to receive and make substantial contact with the bottom surface of the cylindrical frame member.

* * * * *